(12) United States Patent
Hong et al.

(10) Patent No.: US 12,309,829 B2
(45) Date of Patent: May 20, 2025

(54) DATA PROCESSING METHOD AND APPARATUS, AND COMMUNICATION DEVICE

(71) Applicants: Beijing Xiaomi Mobile Software Co., Ltd., Beijing (CN); Beijing University of Posts and Telecommunications, Beijing (CN)

(72) Inventors: Wei Hong, Beijing (CN); Yajun Zhu, Beijing (CN); Tianjia Wang, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 350 days.

(21) Appl. No.: 17/756,864

(22) PCT Filed: Dec. 4, 2019

(86) PCT No.: PCT/CN2019/123123
§ 371 (c)(1),
(2) Date: Jun. 3, 2022

(87) PCT Pub. No.: WO2021/109043
PCT Pub. Date: Jun. 10, 2021

(65) Prior Publication Data
US 2022/0417954 A1  Dec. 29, 2022

(51) Int. Cl.
*H04W 72/56* (2023.01)
*H04W 72/23* (2023.01)
*H04W 72/566* (2023.01)

(52) U.S. Cl.
CPC ......... *H04W 72/569* (2023.01); *H04W 72/23* (2023.01)

(58) Field of Classification Search
CPC ... H04L 5/0053; H04L 5/0048; H04L 5/0023; H04W 72/1268; H04W 72/566
See application file for complete search history.

(56) References Cited

U.S. PATENT DOCUMENTS 11,357,017 B2 * 6/2022 Bagheri ............... H04L 5/0051
2019/0274153 A1 * 9/2019 Park ..................... H04L 5/0044
(Continued)

FOREIGN PATENT DOCUMENTS

CN  107736065 A  2/2018
CN  108811115 A  11/2018
(Continued)

OTHER PUBLICATIONS

"Discussion on pre-emption indication for downlink," Proceedings of the TSG RAN WG1 Meeting #90, Vivio, R1-1712867, Aug. 21, 2017, Prague, Czech Republic, 4 pages.
"Multiplexing of different data channel durations," Proceedings of the 3GPP TSG RAN WG1 Meeting NR#3, Intel Corporation, R1-1716325, Sep. 18, 2017, Nagoya, Japan, 8 pages.
(Continued)

*Primary Examiner* — Yee F Lam
(74) *Attorney, Agent, or Firm* — McCoy Russell LLP

(57) ABSTRACT

A data processing method applied to a base station includes: configuring a first transmission resource for a first priority service; when the remaining transmission resources cannot completely bear service data of a second priority service, selecting at least part among the first transmission resource to be configured for a second priority service, the priority of the second priority service being higher than the priority of the first priority service; and sending first downlink control information (DCI), the first DCI being used to indicate the second priority service preempting the transmission resources of the first priority service.

11 Claims, 9 Drawing Sheets

(56) References Cited

U.S. PATENT DOCUMENTS

| | | | | |
|---|---|---|---|---|
| 2019/0349960 A1* | 11/2019 | Li | ............... | H04L 5/0055 |
| 2020/0052864 A1* | 2/2020 | Hosseinian | ............... | H04L 25/02 |
| 2020/0053698 A1* | 2/2020 | Chen | ............... | H04W 72/1268 |
| 2020/0351903 A1* | 11/2020 | Sarkis | ............... | H04W 72/12 |
| 2020/0367278 A1* | 11/2020 | Hosseini | ............... | H04L 5/0064 |

FOREIGN PATENT DOCUMENTS

| | | | |
|---|---|---|---|
| CN | 109788558 A | 5/2019 |
| CN | 109842946 A | 6/2019 |
| CN | 110192413 A | 8/2019 |
| CN | 110268656 A | 9/2019 |
| WO | 2019019951 A1 | 1/2019 |

OTHER PUBLICATIONS

Multiplexing data with different transmission durations, Proceedings of the 3GPP TSG RAN WG1 Meeting 90bis, Vivio, R1-1717502, Oct. 9, 2017, Prague, Czech Republic, 10 pages.

"Resource Allocation for NR V2X Sidelink Communication," Proceedings of the 3GPP TSG RAN WG1 Meeting #95, Fujitsu, R1-1812410, Spokane, Washington, Nov. 12, 2018, 9 pages.

"Study on NR Vehicle-to-Everything (V2X)," 3GPP TR 38.885, Mar. 2019, 122 pages.

"Final Report of 3GPP TSG RAN WG1 #97 v1.0.0," Proceedings of the 3GPP TSH RAN WG1 Meeting #98, R1-1907973, Prague, Czech Republic, Aug. 26, 2019, 163 pages.

"Evolved Universal Terrestrial Radio Access(E-UTRA); Physical layer procedures," 3GPP TR 36.213, Sep. 2019, 7 pages.

\* cited by examiner

DATA PROCESSING METHOD AND APPARATUS, AND COMMUNICATION DEVICE

CROSS REFERENCE TO RELATED APPLICATION

The present application is a U.S. National Phase of International Application No. PCT/CN2019/123123 entitled "DATA PROCESSING METHOD AND APPARATUS, AND COMMUNICATION DEVICE," and filed on Dec. 4, 2019. The entire contents of the above-listed application is hereby incorporated by reference for all purposes.

BACKGROUND

Internet of vehicles takes an information communication technology as the starting point to be integrated with many cutting-edge technologies and devices of vehicles, roadside infrastructures, communication, positioning and the like and can effectively improve driving safety, improve transportation efficiency and further provide various information services comprehensively for vehicle users, which brings an unprecedented opportunity and challenge to an automobile industry. Vehicle-to-everything (V2X) communication serves as a key technology in Internet of vehicles and is used for providing environment awareness, information exchange and cooperative control. In order to meet demands of Internet of vehicles of the next generation, the 3rd Generation Partnership Project (3GPP) has carried out a series of standard work for a V2X service. A 3GPP technical specification supports two types of different V2X interfaces, one type of which is a cellular communication interface (for example, a Uu interface) for providing communication among a cellular network, roadside infrastructures, pedestrians and vehicles through uplink and downlink of a base station, and the other type of which is a direct communication interface (a PC5 interface), allowing direct communication between vehicles and between a vehicle and a roadside infrastructure.

SUMMARY

Examples of the present disclosure relate to but are not limited to the technical field of wireless communication, in particular to a data processing method and apparatus, and a communication device.

A first aspect of an example of the present disclosure provides a data processing method, performed by a base station and including: configuring a first transmission resource for a first priority service; selecting at least a part of the first transmission resource to be configured for a second priority service in response to determining that rest of transmission resources cannot fully bear service data of the second priority service, where a priority of the second priority service is higher than a priority of the first priority service; and sending first downlink control information (DCI), where the first DCI is used for indicating preemption of a transmission resource of the first priority service by the second priority service.

A second aspect of an example of the present disclosure provides a data processing method, performed by user equipment (UE) and including: receiving first downlink control information (DCI); and transmitting service data according to the first DCI, where transmitting the service data according to the first DCI includes: preempting at least a part of a first transmission resource of a first priority service so as to transmit service data of a second priority service, where a priority of the second priority service is higher than a priority of the first priority service.

A third aspect of an example of the present disclosure provides a communication device, including: a transceiver, a memory and a processor connected with the transceiver and the memory respectively, configured to control the transceiver to send and receive a wireless signal and implement the data processing method provided by the first aspect or the second aspect by executing computer executable instructions stored on the memory.

DETAILED DESCRIPTION

A network architecture and service scenarios described in the examples of the present disclosure are used for more clearly describing the technical solutions of the examples of the present application and do not constitute limitation on the technical solutions provided by the examples of the present disclosure. Those ordinarily skilled in the art can know that the technical solutions provided by the examples of the present disclosure are also suitable for similar technical problems with evolution of the network architecture and emerging of new service scenarios.

The 3GPP V2X standard work is divided into three main stages. The first stage is based on a Long Term Evolution (LTE) technology to meet basic service demands of LTE-V2X and corresponds to LTE Rel-14. The second stage is based on an LTE technology to meet a part of enhanced service demands of NR-V2X (LTE-eV2X) and corresponds to LTE Rel-15. The third stage is based on a 5G NR technology to realize all, or most of enhanced service demands of NR-V2X and corresponds to NR Rel-16 and Rel-17. An advanced V2X service besides a service supported in LTE-V2X is defined in Rel-16 of NR-V2X, and 25 use cases for the advanced V2X service are determined in a 3GPP TR 22.886 document and divided into four use case groups, namely, a vehicle queue, an extended sensor, advanced driving and remote driving. Rel-15 LTE-eV2X further improves properties of time delay, rate and reliability of V2X on the premise of maintaining compatibility with Rel-14 LTE-V2X so as to meet demands of a more advanced V2X service, and its relevant technology is mainly specific to PC5 enhancement and adopts the same resource pool design concept and the same resource allocation format as Rel-14, and thus coexistence with a Rel-14 V2X user is allowed without influence of resource collision interference. An enhanced technology of Rel-15 mainly includes PC5 carrier aggregation, 64 Quadrature Amplitude Modulation (QAM) high-order modulation, transmit diversity, a low-delay related technology, mode 3 and mode 4 resource pool sharing, etc. A Rel-16 5G NR-V2X stage supports all service scenarios of eV2X. A main study work includes design of a New Radio (NR), a Sidelink, NR Uu interface enhancement, NR Uu scheduling NR Sidelink, V2X positioning, a wireless access technology selection mechanism, a Quality of Service (QoS) management technical solution, NR Sidelink and LTE Sidelink coexistence mechanism and Sidelink frequency band, etc.

Figure 1:
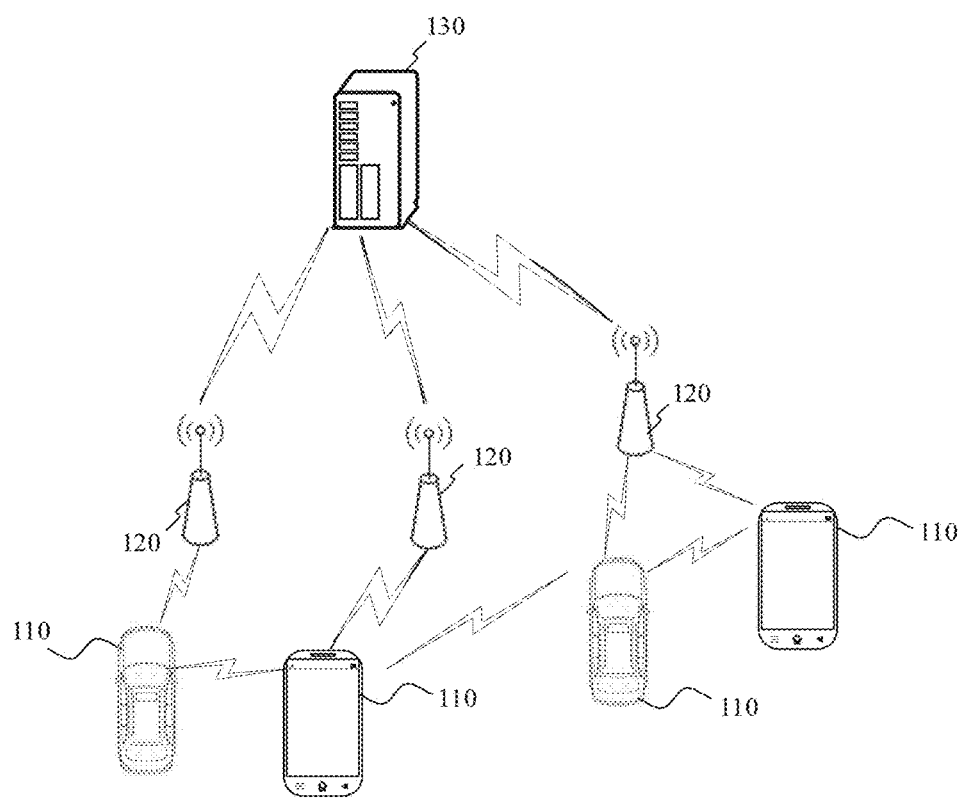
FIG. 1 is a schematic structural diagram of a wireless communication system provided by an example of the present disclosure.

Please refer to FIG. 1, which shows a schematic structural diagram of a wireless communication system provided by an example of the present disclosure. As shown in FIG. 1, the wireless communication system is a communication system based on a cellular mobile communication technology and may include: a plurality of terminals 110 and a plurality of base stations 120.

The terminals 110 may refer to a device providing a voice and/or data connectivity for a user. The terminals 110 may communicate with one or a plurality of core networks via a Radio Access Network (RAN). The terminals 110 may be an Internet of Things terminal, such as a sensor device, a mobile phone (or called "cell" phone) and a computer with the Internet of Things terminal, for example, may be a fixed or portable or pocket or hand-held or computer built-in or vehicle-mounted apparatus. For example, there are a station (STA), a subscriber unit, a subscriber station, a mobile station, a mobile, a remote station, an access point, a remote terminal, an access terminal, a user terminal, a user agent, a user device, or user equipment. Or the terminals 110 may also be a device of an unmanned aerial vehicle. Or the terminals 110 may also be a vehicle-mounted device, for example, may be a trip computer with a wireless communication function, or a wireless terminal externally connected with the trip computer. Or the terminal 110 may also be a road-side infrastructure, for example, may be a street lamp, a signal lamp or other road-side infrastructures, etc. with a wireless communication function.

The base stations 120 may be a network side device in a wireless communication system. The wireless communication system may the 4th generation (4G) mobile communication system, also called a Long Term Evolution (LTE) system; or the wireless communication system may also be a 5G system, also called a new radio (NR) system or a 5G NR system. Or the wireless communication system may also be a next generation system of the 5G system. An access network in the 5G system may be called a New Generation-Radio Access Network (NG-RAN).

The base station 120 may be an evolution base station (eNB) adopted in a 4G system. Or the base station 120 may also be a base station (gNB) of a centralized distributed architecture in the 5G system. When the base station 120 adopts the centralized distributed architecture, the base station usually includes a central unit (CU) and at least two distributed units (DU). A protocol stack of a Packet Data Convergence Protocol (PDCP) layer, a Radio Link Control (RLC) layer and a Media Access Control (MAC) layer is arranged in the central unit, a Physical (PHY) layer protocol stack is arranged in the distributed units, and the examples of the present disclosure do not limit a specific implementation of the base station 120.

Wireless connection may be established between the base station 120 and the terminal 110 through a wireless radio. In different implementations, the wireless radio is a wireless radio based on a fourth generation (4G) mobile communication network technology standard, or the wireless radio is a wireless radio based on a fifth generation (5G) mobile communication network technology standard, for example, the wireless radio is a new radio, or the wireless radio may also be a wireless radio based on a next generation mobile communication network technology standard of 5G.

In some examples, an End to End (E2E) connection may also be established between the terminals 110. For example, there are scenarios of vehicle to vehicle (V2V) communication, vehicle to Infrastructure (V2I) communication and vehicle to pedestrian (V2P) communication in vehicle to everything (V2X) communication.

In some examples, the above wireless communication system may also contain a network management device 130.

The plurality of base stations 120 are connected with the network management device 130 respectively. The network management device 130 may be a core network device in a wireless communication system, for example, the network management device 130 may be a Mobility Management Entity (MME) in an Evolved Packet Core (EPC). Or the network management device may also be other core network devices, for example, a Serving GateWay (SGW), a Public Data Network GateWay (PGW), a Policy and Charging Rules Function (PCRF) unit or a Home Subscriber Server (HSS), etc. The examples of the present disclosure do not limit an implementation form of the network management device 130.

After an NR-V2X technical study is launched in an RAN #80$^{th}$ plenary session in June 2018, a 3GPP workgroup conducted an active discussion specific to a study content of NR-V2X, and channels of an NR sidelink are mainly composed of a Physical Sidelink Control Channel (PSCCH), a Physical Sidelink Shared Channel (PSSCH), a Physical Sidelink Broadcast Channel (PSBCH) and a Physical Sidelink Feedback Channel (PSFCH). PSCCH, PSSCH and PSFCH already exist in the LTE-V2X stage.

PSFCH is newly introduced for supporting HARQ transmission by NR-V2X. As for sidelink resource allocation, NR-V2X supports two types of resource allocation solutions of mode 1 and mode 2. In mode 1, the base station schedules a sidelink resource to UE for data transmission of sidelink. In mode 2, the UE determines a sidelink resource preconfigured by the base station/a network. An NR sidelink resource is allocated by NR Uu in mode 1 and includes NR, Uu and NR sidelink sharing carrier and NR sidelink private carrier. NR-V2X supports two solutions of dynamic resource allocation and configuration authorization in resource allocation mode 1. NR-V2X supports resource awareness and selection/reselection processes in mode 2, the awareness process may be based on demodulation of SCI information of other UE or measurement results of other sidelink, demodulation of SCI information at least reflects a resource utilization condition on sidelink, and other measurements include Layer (L) 1 sidelink Reference Signal Receive Power (RSRP) measurement based on a sidelink Demodulation Reference Signal (DMRS). The resource selection/reselection process may determine a resource for sidelink transmission based on a result of the above awareness process.

In NR-V2X, different V2X applications may have different QoS requirements. Some high-priority services need end-to-end delay of 3 ms, for example, used for emergency trajectory calibration, and some low-priority services need end-to-end delay of decades of tens of milliseconds. As for the high-priority services, a data packet needs to be transmitted as soon as it arrives so as to meet demands of time delay of the high-priority services. If there is no transmission resource after the data packet of the high-priority services arrives, the demands of the time delay of the high-priority services will not be guaranteed. In NR-V2X, the high-priority service and the low-priority service share a resource pool, in order to solve the problem that the time delay of the high-priority service cannot be met due to insufficient transmission resource, a resource preemption mechanism is proposed in the RAN1 #97$^{th}$ session, that is, when the transmission resource is insufficient, the high-priority service is allowed to preempt a transmission resource of the low-priority service. In NR-V2X, there is no available complete technical solution for how to realize preemption of a reserved resource of the low-priority service by the high-priority service at present.

Figure 2:
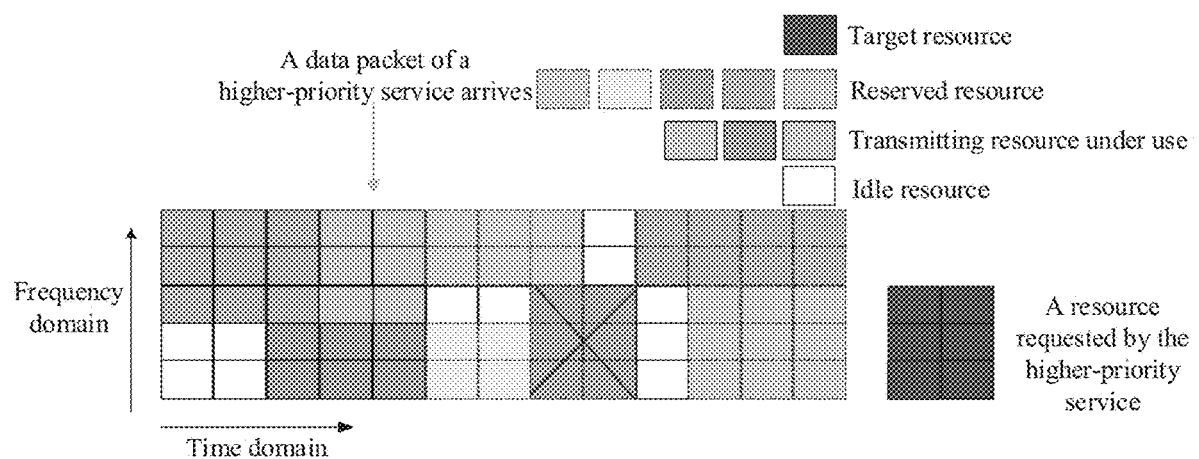
FIG. 2 is a schematic diagram of preemption of a transmission resource provided by an example of the present disclosure.

FIG. 2 shows a schematic diagram of preemption of a transmission resource, and the transmission resource is partitioned in a frequency domain and a time domain, so that each transmission resource is obtained. Partition granularity of these transmission resources may be: a symbol, a time slot, a sub-frame or a frame; a Resource Element (RE), a Resource Block (RB), etc. The resources may be divided into a reserved resource, a transmitting resource under use, an idle resource and a target resource according to a user state of each of the resources. The reserved resource is a resource pre-allocated for a certain service or a reserved and unallocated resource. The idle resource is a resource which is unallocated at present and does not belong to the reserved resource. The transmitting resource under use is a resource which is transmitting data. The target resource is a resource which is requested by the high-priority service. In FIG. 2, a resource covered with a cross is the target resource which belongs to the reserved resource. Under the condition of meeting a certain condition, the high-priority service can preempt the resource.

In NR Downlink (DL), an ultra-reliable low latency communications (URLLC) service and an enhance Mobile Broadband (eMBB) service are subjected to resource multiplexing. A solution proposed for downlink transmission of URLLC data of the URLLC service is: when the URLLC data arrive, a 5G base station (for example, gNB) immediately schedules the URLLC data, that is, puncturing transmission is performed in an eMBB data block of the eMBB service which already finishes resource allocation, so fastest data transmission is realized, and the demand of the URLLC data for time delay is met. An eMBB user directly decodes all received data, if an eMBB data block is punched by the URLLC service, the eMBB user may fail in decoding, a bit error rate of the eMBB service is greatly increased, extra TB retransmission is caused, and actually, data stolen by the URLLC may be several connected Code Blocks (CB) in a TB.

A PI field is introduced in NR downlink (DL) and used for indicating a portion of a scheduling resource of the eMBB service preempted by the URLLC service, so that a retransmission mode based on a Code Block Group (CBG) may be adopted during retransmission, and a resource utilization ratio is increased. A detection region of the PI field is generally located at an end or a starting position of an eMBB time slot, and gNB needs to inform the eMBB user of resource preempted information in time by configuring a downlink PI field in a form of a bitmap (each bit in the DL PI field corresponds to preemption information of a time-frequency resource block). RRC signaling configures an eMBB UE to monitor a preemption indication (PI) and needs to semi-statically send a parameter related to preemption indication configuration to the UE besides informing the eMBB UE of needing to monitor the preemption indication so that the UE can successfully monitor and decode a content in the PI field.

Some problems may occur if a mechanism process and a signaling format of preempting the eMBB service by the URLLC service in NR DL are directly applied to NR-V2X. First, PI in NR downlink is based on the form of bitmap, a frequency-domain resource indicates a whole reference bandwidth, a reserved resource in an RE level is hardly selected in PI in the form of the bitmap, and accurate indication of the reserved resource of the low-priority service in NR-V2X cannot be realized. Second, PI signaling in NR downlink is sent after the URLLC service preempts an eMBB data scheduling resource, and the URLLC service and the eMBB service are allowed to be transmitted within a short time by using an overlapping resource. Mutual interference caused by transmission of the two services in NR-V2X by using the overlapping resource may lead to reduction of a demodulation property of the two services, and transmitting the two services by using the same resource at the same time is not allowed in NR-V2X. Third, preemption in NR downlink is based on per-cell, preemption signaling needs to be sent by using Group Downlink Control Information (group-DCI), and DCI in NR-V2X used for a scheduling sidelink (also called sidelink transmission resource) is based on UE granularity.

Figure 3:
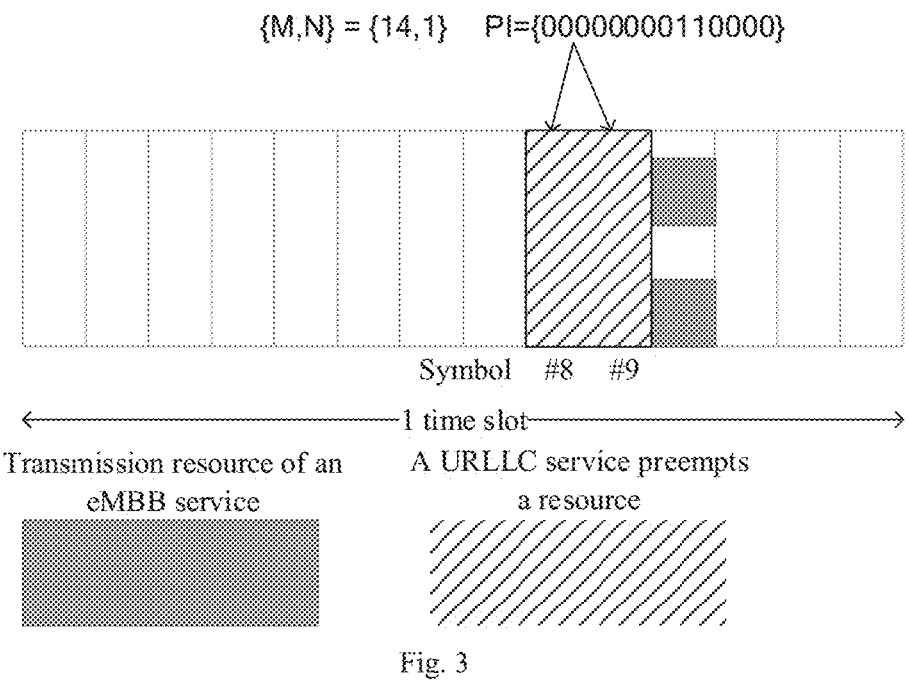
FIG. 3 is a schematic diagram of preemption of a transmission resource provided by an example of the present disclosure.

FIG. 3 is a schematic diagram of preemption of a transmission resource of an eMBB service by a URLLC service. The PI field carries two numerical values, respectively M and N, M is a time domain portion, N is a frequency domain portion, and if M is equal to 14 and N is equal to 1, the quantity of bits needed by the PI field is 14. For example, when PI carries 00000000110000, it indicates that the URLLC service preempts the transmission resource of the eMBB service. As shown in FIG. 3, the URLLC service preempts the transmission resource originally allocated to the eMBB service on symbols #8 and #9 in a time slot.

Figure 4:
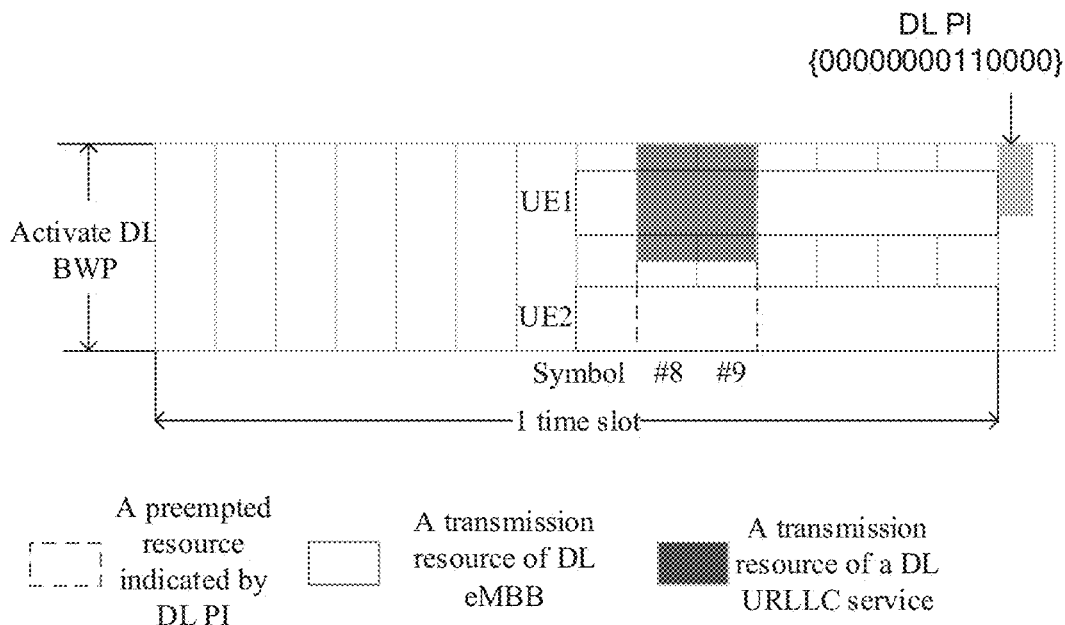
FIG. 4 is a schematic diagram of preemption of a transmission resource provided by an example of the present disclosure.

FIG. 4 is a schematic diagram of another preemption of a transmission resource of the eMBB service by the URLLC service. If DL PI sent in downlink carries 00000000110000, it indicates that resource scheduling of the URLLC service at a time respectively preempts a transmission resource of a DL eMBB service of UE1 and UE2. The transmission resource of the DL eMBB service is a transmission resource for transmitting downlink data of the eMBB service. As shown in FIG. 4, the URLLC service preempts a transmission resource originally allocated to the eMBB service of the UE1 and the UE2 on the symbols #8 and #9 in a time slot.

Figure 5:
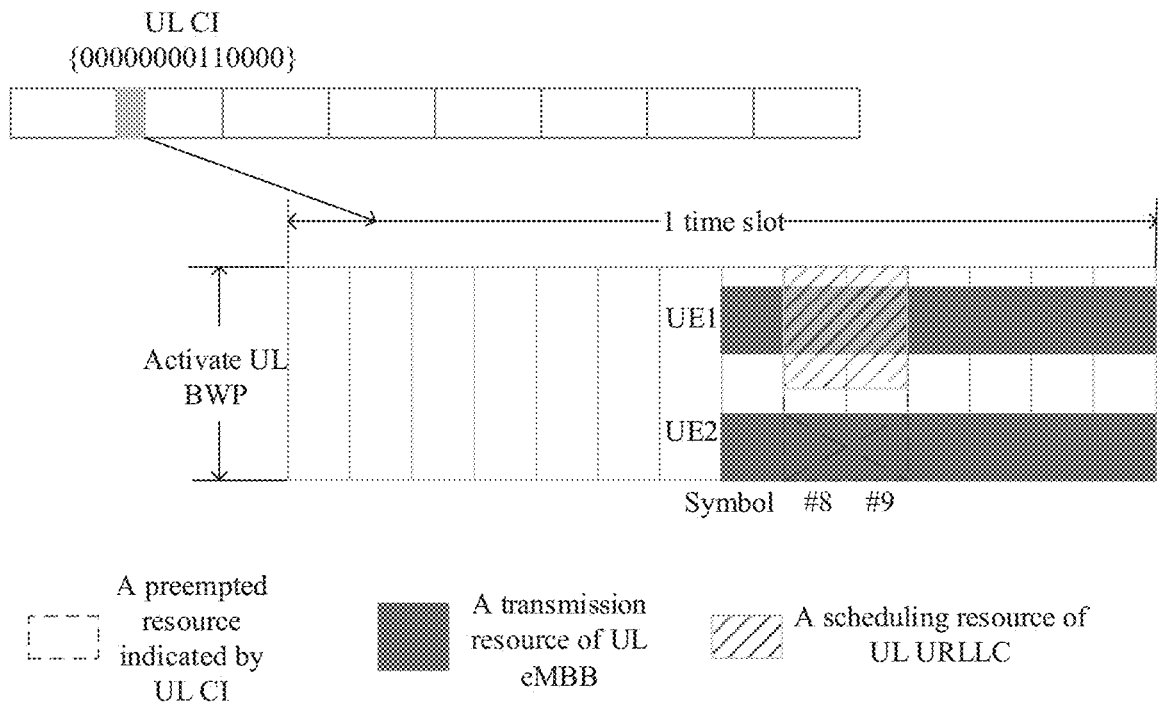
FIG. 5 is a schematic diagram of preemption of a transmission resource provided by an example of the present disclosure.

FIG. 5 is a schematic diagram of another preemption of a transmission resource of the eMBB service by the URLLC service. If an Uplink (UL) Cancellation Indication (CI) sent in downlink carries 00000000110000, it indicates that the transmission resource of the eMBB service is canceled, that is, the URLLC service respectively preempts the transmission resource of the DL eMBB service of the UE1 and UE2. The transmission resource of the DL eMBB service is a transmission resource for transmitting downlink data of the eMBB service. As shown in FIG. 5, the URLLC service preempts the transmission resource originally allocated to the eMBB service of the UE1 and the UE2 on the symbols #8 and #9 in a time slot.

As shown in combination of FIG. 2 and FIG. 5, indication granularity of preemption of a transmission resource by using PI and CI is too coarse, a phenomenon of resource wastes is caused, and meanwhile there is a phenomenon of reducing the demodulation property of transmission of the two services if the two services are transmitted by using the overlapping resource. Besides, this type of resource preemption is based on cell granularity, and there may be no cell concept in a V2X system.

Figure 6:
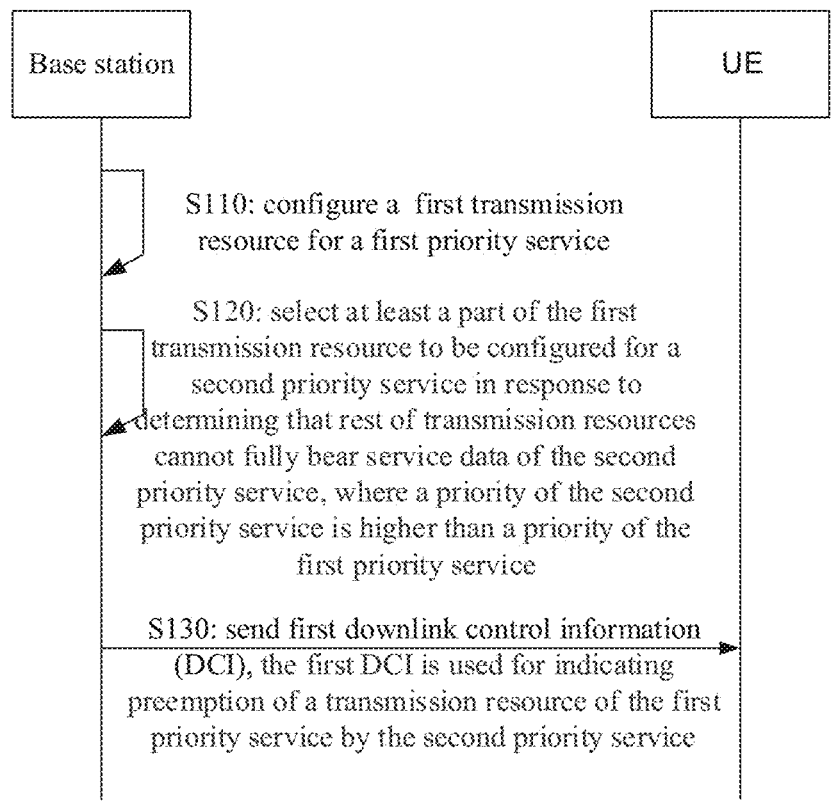
FIG. 6 is a schematic flowchart of a data transmission method provided by an example of the present disclosure.

As shown in FIG. 6, an example provides a data processing method, applied to a base station and including:

S110: a first transmission resource is configured for a first priority service;

S120: at least a part of the first transmission resource is selected to be configured for a second priority service in response to determining that rest of transmission resources cannot fully bear service data of the second priority service, where a priority of the second priority service is higher than a priority of the first priority service; and

S130: first downlink control information (DCI) is sent, where the first DCI is used for indicating preemption of a transmission resource of the first priority service by the second priority service.

For example, the base station configures a transmission resource for the first priority service in advance, and the transmission resource configured for the first priority service is called the first transmission resource. The first transmission resource is a reserved resource, which may be a time-frequency domain resource reserved specially for transmission of the first priority service.

The first transmission resource may include: one or a plurality of symbols. For example, the first transmission resource may be a plurality of symbols continuously distributed or discretely distributed in a time slot. At the moment, preemption of the first transmission resource of the first priority service by the second priority service realizes resource preemption in a symbol level instead of resource preemption in a coarse-grained time slot level or sub-frame level, so a phenomenon of wastes of the transmission resource caused by coarse-grained resource preemption is reduced.

If service data of the second priority service are in urgent need to be transmitted at present and the rest of idle transmission resources of a whole wireless communication system are insufficient to bear all service data of the second priority service, at least a part of the first transmission resource is selected and configured for the second priority service, and first DCI is sent, of which a corresponding terminal is informed, a part of or all of the first transmission resource in the first priority service is preempted by the second priority service at present and will be used for transmission of the service data of the second priority service.

The priority of the first priority service is lower than the priority of the second priority service. For example, hypothetically, the first priority service includes but is not limited to an eMBB service, and the second priority service may include: a URLLC service.

For example, during communication between vehicles through SL, a service corresponding to service data of driving emergency avoidance between the vehicles is configured to be the second priority service with the higher priority, and common service data of a sharing route between the vehicles or interaction of vehicles' locations are configured to be the first priority service with the lower priority.

For example, a vehicle A breaks down, which may endanger driving safety of other vehicles, service data in this case occur unexpectedly in general, there is no need to preconfigure a reserved resource for transmission, and as an emergency degree is high, a higher priority is configured. This type of service can preempt the resource of the lower-priority service to be transmitted.

The first DCI is a type of DCI, and "first" here is used in a general sense. DCI sending has a feature of high speed, and emergency configuration of a resource of the second priority service may be realized through the first DCI. In this way, one the one hand, emergency transmission of service data of the higher-priority service is guaranteed, on the other hand, the first priority service of which the transmission resource is preempted may be informed of pausing transmission through sending of the first DCI, interference with transmission of the service data of the second priority service is reduced, and high-reliability transmission of the service data of the second priority service is guaranteed.

By means of the technical solutions provided by the examples of the present disclosure, when a transmission resource needed by the second priority service is not sufficient, at least a part of the first transmission resource preconfigured for the first priority service is allocated for the second priority service. The first transmission resource of the first priority service allocated for certain UE is usually in a symbol level, so preemption of the first transmission resource in the examples of the present disclosure is fine-granularity resource preemption.

In some examples, the first DCI includes a preemption field.

The preemption field is used for indicating user equipment (UE) of the first priority service that the transmission resource of the first priority service is preempted by the second priority service in response to determining that the preemption field has a first value; or the preemption field is used for indicating UE of the second priority service that the second priority service preempts the transmission resource of the first priority service in response to determining that the preemption field has a second value.

The preemption field in the example of the present disclosure here includes one or a plurality of bits. For example, the preemption field includes one bit, two bit values ("0" and "1") of the bit may indicate two states of preempting and preempted. For example, hypothetically, the bit value "0" of the bit included in the preemption field indicates that the transmission resource of the first priority service is preempted by the second priority service, the bit value "1" indicates that the transmission resource of the first priority service is not preempted by the second priority service.

Accordingly, UE which receives the first DCI can fast determine whether the current own first transmission resource is preempted.

In some examples, in response to determining that the preemption field includes one bit, the two bit values given to the bit merely indicate two preempting states that the first transmission resource of the first priority service is preempted in whole or not preempted.

The preemption field may include N bits, the first transmission resource may be divided into N transmission sub-resources, and one bit indicates a preempted state of one transmission sub-resource. For example, the $n^{th}$ bit indicates preemption of the $n^{th}$ transmission sub-resource, at the moment, preemption of the transmission resource of the first priority service by the second priority service may be partial preemption. If the preemption field including the plurality of bits can further realize granularity refining of resource preemption, unnecessary wastes of the transmission resource are further reduced.

Figure 7:
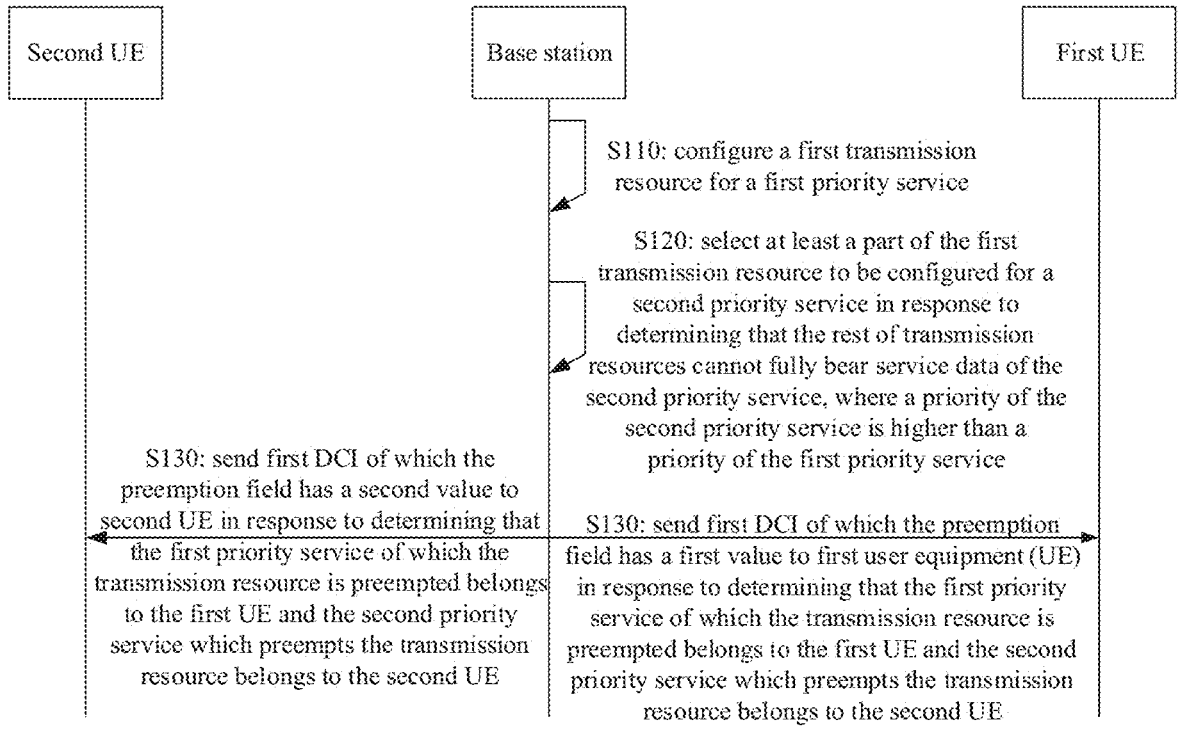
FIG. 7 is a schematic flowchart of a data transmission method provided by an example of the present disclosure.

In some examples, as shown in FIG. 7, S130 may include:

first DCI of which the preemption field has the first value is sent to first user equipment (UE) and first DCI of which the preemption field has the second value is sent to second UE in response to determining that the first priority service of which the transmission resource is preempted belongs to the first UE and the second priority service which preempts the transmission resource belongs to the second UE.

The first priority service and the second priority service which have a resource preemption relation may be from the same UE or different UE. If the first priority service and the second priority service are from the different UE, for example, the above first UE and second UE, the DCI needs to be sent to the first UE and the second UE respectively. In the example of the present disclosure, the two bit values of the bit of the preemption field correspond to two resource allocation states of resource allocation and resource recovery. Accordingly, at the moment, the bit contained in the preemption field in the first DCI received by the first UE of which the transmission resource is preempted has the first value indicating resource recovery, and the bit contained in the preemption field in the first DCI received by the second UE which preempts the transmission resource has the second value indicating resource allocation.

In the example of the present disclosure, the preemption state of preemption of the first transmission resource is sent directly through the DCI, which has a feature of shorter time delay than MAC layer signaling and RRC signaling.

In some other examples, S130 may include: the first DCI of which the preemption field has the first value is sent to third UE in response to determining that the first priority service of which the transmission resource is preempted and the second priority service which preempts the transmission resource belong to the same third UE.

In some other examples, S130 may include:

the first DCI of which the preemption field has the second value is sent to the third UE in response to determining that the first priority service of which the transmission resource is preempted and the second priority service which preempts the transmission resource belong to the same third UE.

That is, in response to determining that the first priority service and the second priority service which have the transmission resource preemption relation belong to the same UE (namely, the above third UE), the first DCI carrying the preemption field having the first value or the second value may be sent, the first DCI is received, so the third UE knows that at least a part of the first transmission resource of the own first priority service is preempted by the own second priority service.

If both the first priority service and the second priority service belong to the third UE, only one piece of first DCI is sent to the third UE, the quantity of DCI sent is reduced, and overhead of DCI signaling and occupied time-frequency domain resources is reduced.

In some examples, S130 may include: first DCI scrambled by using a first sequence is sent in response to determining that the second priority service is a periodical service; or first DCI scrambled by using a second sequence is sent in response to determining that the second priority service is a non-periodical service.

The second priority service may be the periodical service or the non-periodical service, through scrambling by using different sequences, UE which receives the first DCI knows that whether preemption of the first transmission resource of the first priority service by the second priority service at present is a periodical preemption. If the preemption is not the periodical preemption, it indicates that transmission resource preemption indicated by the first DCI is one-time preemption, at least a part of the first transmission resource in a cycle of the first priority service corresponding to when the first DCI is sent is allocated for the second priority service for use.

In response to determining that the second priority service is the periodical service, the periodical service may be a semi-persistent scheduling periodical service. An end position of the semi-persistent scheduling periodical service may be indicated by the base station through high-layer signaling. The high-layer signaling includes but is not limited to MAC signaling or RRC signaling. Certainly, a non-semi-persistent scheduling periodical service may also be sent through high-layer signaling to indicate that transmission of the service data of the second priority service is abandoned, so preemption of the first transmission resource of the first priority service by the second priority service ends.

The first DCI is scrambled by the different sequences, so the UE can determine whether the second priority service is the periodical service according to the sequences, so bit overhead generated by specifically indicating the periodical service or the bit overhead caused by sending DCI in each cycle is reduced.

In some examples, the first sequence is: sidelink vehicle (SLV)-semi-persistent scheduling (SPS)-radio network temporary identity (RNTI); and the second sequence is: SLV-RNTI.

In the example of the present disclosure, the two sequences of SLV-SPS-RNTI and SLV-RNTI are multiplexed as a sequence, a special sequence does not need to be set, special scrambling signaling does not need to be sent in the high-layer signaling, so signaling overhead is reduced, and the quantity of sequences needing to be stored in UE is reduced through sequence multiplexing.

In some examples, the method further includes:

a second transmission resource is reallocated for the first priority service of which the transmission resource is preempted; and second DCI carrying resource information of the second transmission resource is sent.

In some examples, the service data of the first priority data also need to be transmitted, in order to guarantee transmission of the first priority service, the transmission resource may be reallocated for the first priority service, and the reallocated transmission resource here is the second transmission resource.

In some examples, retransmission is configured for the first priority service, the first transmission resource preempted by the second priority service merely breaks transmission once or a few times of the first priority service, at the moment, transmission at least one time is maintained for the first priority service, the base station can also successfully receive the transmission this time, and at the moment, the second transmission resource does not need to be reallocated for the first priority service. For example, hypothetically, the first priority service is configured to be retransmitted four times, the second priority service preempts the first transmission resource of transmission only once of the first priority service, at the moment, the first priority service still has the rest of the transmission resource of transmission three times, it can be believed that the base station can still correctly receive the service data of the first priority service at the moment, and the transmission resource does not need to be reconfigured for the first priority service.

In some examples, the method further includes:

a resource scheduling request of the second priority service is received;

third DCI carrying resource information of a physical uplink shared channel (PUSCH) resource is sent according to the resource scheduling request;

a buffer status report (BSR) of the second priority service is received on the PUSCH resource; and the quantity of resources needed to transmit the service data of the second priority service is determined according to the BSR of the second priority service.

The BSR carries a buffer volume of the service data of the second priority service, and the buffer volume is a data volume of the service data of the second priority service needing to be reported by UE.

The data volume may be used for estimating, by the base station, a transmission resource needing to be allocated for the second priority service.

For example, the resource scheduling request may be received on the Physical Uplink Control Channel (PUCCH). The resource scheduling request may carry a service identifier and/or priority identifier of the second priority service. If the resource scheduling request carries merely the service identifier, the base station determines a priority of a service needing resource allocation on the basis of a corresponding relation between the service identifier and the priority. The priority identifier directly indicates the priority of the service needing resource allocation.

The base station sends the third DCI on the basis of the resource request, and the third DCI indicates the PUSCH resource reporting the BSR. The PUSCH resource is a time-frequency resource allocated for the PUSCH.

The UE, after receiving the third DCI, receives the BSR on the corresponding PUSCH resource according to the third DCI.

After the BSR is received, the base station can determine the quantity of the resources needing to be allocated for the second priority service. If the current rest of resources are less than the quantity of resources needed by the second priority service, the first transmission resource of the first priority service needs to be preempted.

In some examples, the method further includes:

In mode 1 of new radio vehicle-to-everything R-V2X, as for sidelink configuration, a physical sidelink control channel (PSCCH) resource and a physical sidelink shared channel (PSSCH) resource are allocated according to the resource scheduling request.

S120 may include: at least a part of the PSCCH resource and/or the PSSCH resource configured for the first priority service is selected to be allocated for the second priority service according to the quantity of resources.

When data are transmitted on the SL and the base station participates in SL resource allocation, the base station may allocate a part of or all of the PSCCH resource and/or the PSSCH resource of the first priority service for the second priority service, so that preemption of the transmission resource of the first priority service by the second priority service is realized.

Figure 8:
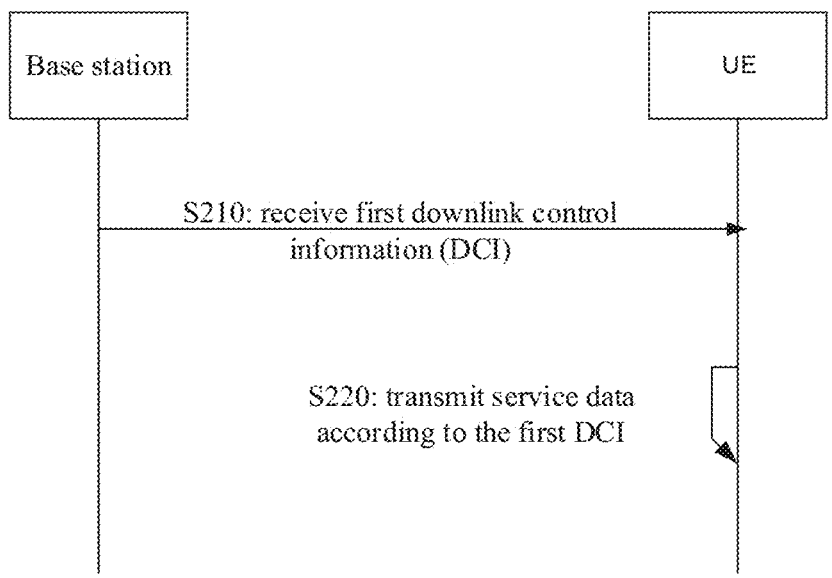
FIG. 8 is a schematic flowchart of a data transmission method provided by an example of the present disclosure.

As shown in FIG. 8, an example provides a data processing method, applied to user equipment (UE) and including:

S210: first downlink control information (DCI) is received;

S220: service data are transmitted according to the first DCI, for example, S220 may include: at least a part of a first transmission resource of a first priority service is preempted so as to transmit service data of a second priority service according to the first DCI; and/or transmission of the first priority service of which the transmission resource is preempted is abandoned, where a priority of the second priority service is higher than a priority of the first priority service.

The UE may be the above first UE or second UE or third UE.

In the example of the present disclosure, the UE may receive the first DCI sent by a base station, and according to indication of the first DCI, the service data of the second priority service are transmitted or transmission of the first priority service is abandoned.

For example, the transmission resource A of the first priority service is preempted, so transmission of service data of the first priority service on the transmission resource A is abandoned.

The UE may be UE using SL for data transmission, which specifically may be vehicle-mounted UE, for example, any type of UE in a V2X system.

In some examples, the first DCI includes a preemption field.

The preempting at least a part of the first transmission resource of the first priority service so as to transmit the service data of the second priority service; and/or the abandoning transmission of the first priority service of which the transmission resource is preempted includes:

at least a part of the first transmission resource of the first priority service is preempted so as to transmit the service data of the second priority service in response to determining that one of the first priority service of which the transmission resource is preempted and the second priority service which preempts the transmission resource belongs to the UE and the preemption field has a first value;

or, transmission of the first priority service of which the transmission resource is preempted is abandoned in response to determining that one of the first priority service of which the transmission resource is preempted and the second priority service which preempts the transmission resource belongs to the UE and the preemption field has a second value;

or, at least a part of the first transmission resource of the first priority service is preempted so as to transmit the service data of the second priority service and transmission of the first priority service of which the transmission resource is preempted is abandoned in response to determining that both the first priority service of which the transmission resource is preempted and the second priority service which preempts the transmission resource belong to the UE and the preemption field has the first value;

or, at least a part of the first transmission resource of the first priority service is preempted so as to transmit the service data of the second priority service and transmission of the first priority service of which the transmission resource is preempted is abandoned in response to determining that both the first priority service of which the transmission resource is preempted and the second priority service which preempts the transmission resource belong to the UE and the preemption field has the second value.

If the first priority service and the second priority service belong to the UE, the UE, after receiving one DCI carrying the first value or the second value, will transmit the service data of the second priority service on the preempted transmission resource of the first priority service on the one hand and abandon transmission of the service data of the first priority service on the preempted transmission resource on the other hand.

If the first priority service and the second priority service belong to the different UE, the UE specifically determines whether to abandon transmission of the service data of the first priority service on the preempted transmission resource or to preempt the first transmission resource of the other UE to transmit the second priority service according to a bit value of the preemption field in the first DCI.

In some examples, the method further includes:

second DCI carrying resource information of a second transmission resource is received; and the service data of the first priority service of which the transmission resource is preempted are transmitted on the second transmission resource.

If the first transmission resource of the first priority service of the UE is preempted, the base station may reconfigure the second transmission resource for the first priority service, at the moment, the UE will receive the second DCI, so the UE can transmit, on the second transmission resource according to the second DCI, the service data of the first priority service whose transmission is abandoned on the first transmission resource.

In some examples, the method further includes:

it is determined that the second priority service which preempts the transmission resource is a periodical service and periodically preempts at least a part of the first transmission resource of the first priority service in response to determining that the first DCI is successfully descrambled by using a first sequence; or it is determined that the second priority service which preempts the transmission resource is a non-periodical service in response to determining that the first DCI is successfully descrambled by using a second sequence.

In the example of the present disclosure, the first DCI is transmitted after being scrambled, different sequences correspond to whether the second priority service is the periodical service.

After the UE receives the first DCI, the first DCI will be descrambled by respectively using the first sequence and the second sequence, if descrambling succeeds by using the first sequence, it is determined that the second priority service is the periodical service, and if descrambling succeeds by using the second sequence, it is determined that the second priority service is the non-periodical service.

If the second priority service is the periodical service, it indicates that the first transmission resource is periodically preempted to transmit the second priority service.

In some examples, the method further includes:

high-layer signaling indicating that transmission of the second priority service stops is received in response to determining that the second priority service is the periodical service; and transmission of the service data of the second priority service by using the first transmission resource is stopped and/or transmission of the service data of the first priority service by using the first transmission resource is recovered according to the high-layer signaling.

In some examples, the first sequence is: sidelink vehicle (SLV)-semi-persistent scheduling (SPS)-radio network temporary identity (RNTI); and the second sequence is: SLV-RNTI.

The SLV-SPS-RNTI and the SLV-RNTI here are multiplexed as the first sequence and the second sequence to indicate whether the second priority service is the periodical service.

In some other examples, the method further includes:

resource scheduling request of the second priority service is reported;

third DCI carrying resource information of a physical uplink shared channel (PUSCH) resource sent according to the resource scheduling request is received; and a buffer status report (BSR) of the second priority service is reported on the PUSCH resource, where the BSR is used for enabling the base station to determine the quantity of resources needed to transmit the service data of the second priority service.

The base station can conveniently allocate the needed transmission resource for the second priority service through reporting of the BSR.

In an NR-V2X system, the base station maintains a reserved resource allocation table. Under the condition that the transmission resource of a higher-priority service is insufficient, a reserved resource of a lower-priority service may be preempted for the higher-priority service within a range of a specific cell according to the reserved resource allocation table.

For example, the example of the present disclosure provides a higher-priority service resource preemption mechanism oriented to NR-V2X: if the high-priority service arrives and discovers that there is no available transmission resource, gNB performs resources preemption for the higher-priority service in the reserved resource maintained by the gNB at the moment, and the higher-priority service is transmitted by using the preempted reserved resource, and a demand of time delay of the higher-priority service is guaranteed.

In order to reduce transmission interference caused by a conflict of transmission resources of different services, data transmission of the lower-priority service is supposed to be abandoned on a previous reserved resource, namely the preempted resource used by the higher-priority service. In order to reduce the conflict of the transmission resources of the different services, the example of the present disclosure brings up a proposal that a PI field is introduced in the DCI to indicate a use status of the reserved resource so as to guarantee that the same resource is used by only one type of service. If a situation that the higher-priority service preempts the reserved resource of the lower-priority service occurs, PI needs to be carried in the DCI, a transmission resource this time is allocated for a transmitting end user of the higher-priority service, and meanwhile, the PI is carried in the DCI so as to inform a transmitting end user of the preempted lower-priority service of abandoning transmission on the preempted reserved resource.

Figure 9:
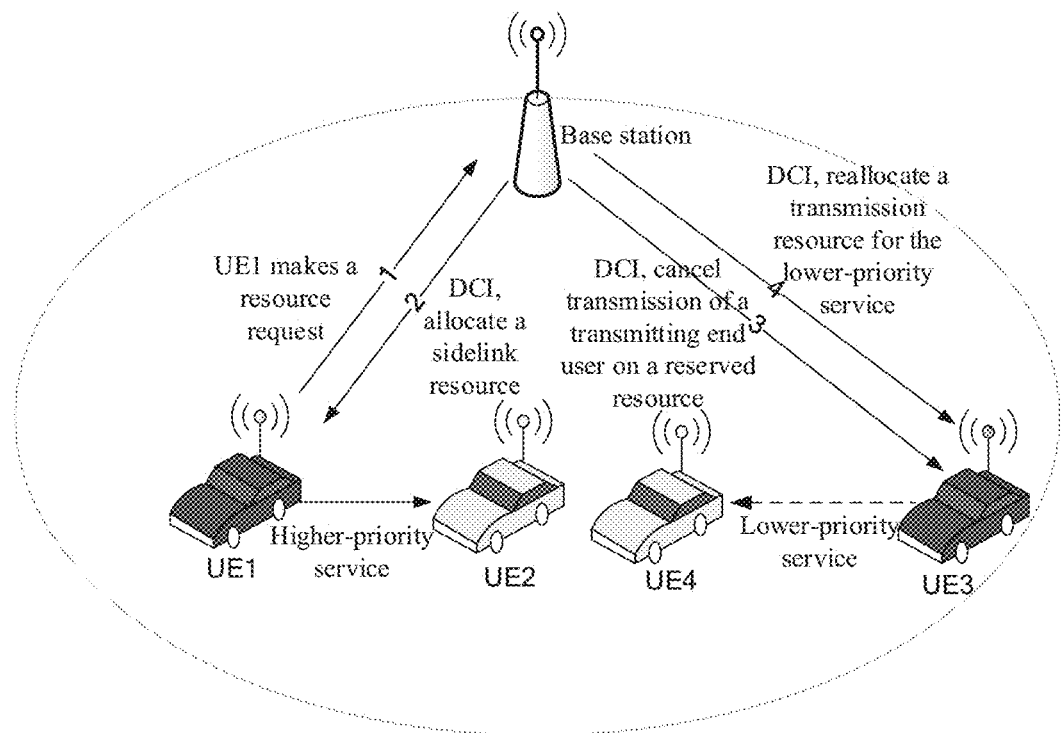
FIG. 9 is a schematic flowchart of a data transmission method provided by an example of the present disclosure.

As shown in FIG. 9, the example of the present disclosure takes the following two cases into consideration.

Case 1: resource preemption of different users between different links, as shown in FIG. 9. The high-priority service and the lower-priority service each maintain a sidelink (SL), user equipment at two ends of transmitting and receiving links of the higher-priority service and the lower-priority service is different. Given that the higher-priority service preempts the reserved resource of the lower-priority service, when the higher-priority service arrives, transmitting UE makes a resource request to the base station, the base station allocates a transmission resource for the higher-priority service by sending DCI to the transmitting UE of the higher-priority service, meanwhile, the base station needs to inform the lower-priority service of abandoning transmission on the preempted reserved resource, the base station sends the DCI to the transmitting UE of the lower-priority service so as to withdraw the right of use on the reserved resource and afterwards reallocate a transmission resource for the lower-priority service.

As shown in FIG. 9, vehicle-mounted equipment UE1, UE2, UE3 and UE4 respectively establishes connection with the base station, SL resource scheduling is requested to the base station through the connection, and communication between UE is performed on the basis of SL resources scheduled by the base station. For example, the data processing method provided by the example may include:

1: UE1 makes a resource request for resource scheduling for the higher-priority service;

2: the base station sends the DCI to UE1, and the sidelink resource is allocated through the DCI;

3: the base station sends the DCI to UE3, and transmission of UE3 on the reserved resource is canceled through the DCI; and 4: the base station sends the DCI to UE3, and the transmission resource is reallocated for the lower-priority service of UE3 through the DCI.

Figure 10:
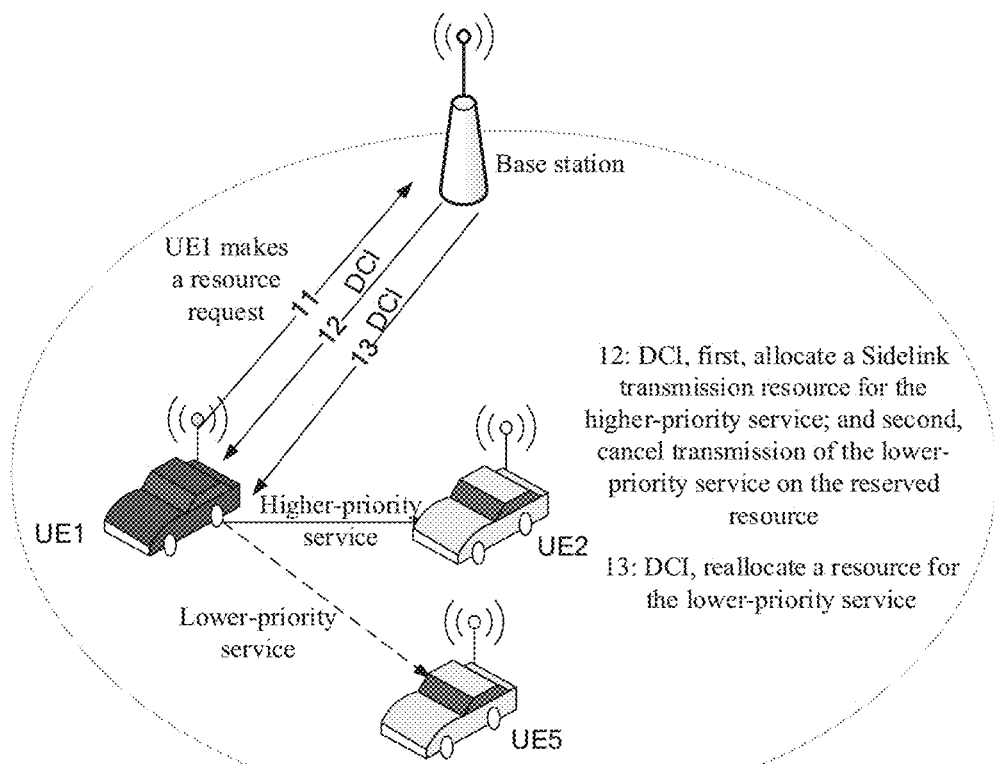
FIG. 10 is a schematic flowchart of a data transmission method provided by an example of the present disclosure.

Case 2: resource preemption of the same user between different links, as shown in FIG. 10. The transmitting end users of links of the high-priority service and the lower-priority service are the same, that is, resource preemption occurs between different services of the same user. A signaling flow on NR Uu is approximately the same as case 1, which differs in that there is no need to independently send the DCI to withdraw the right of use of the lower-priority service on the reserved resource. This is because the transmitting end users of the two services with different priorities are the same, if preemption of the reserved resource of the lower-priority service by the higher-priority service occurs, the transmitting end user may actively abandon transmission of the lower-priority service on the allocated resource after receiving the transmission resource allocated to the transmitting end user by the base station.

For example, the data processing method provided by the example may include:

11: UE1 makes the resource request for resource scheduling for the higher-priority service;

12: the base station sends the DCI to UE1, and the sidelink resource is allocated through the DCI; and 13: the base station sends the DCI to UE1, and the transmission resource is reallocated for the lower-priority service of UE5 through the DCI. Transmission of the service data of the higher-priority service is performed between UE1 and UE2, and transmission of the service data of the lower-priority service is performed between UE1 and UE5.

Figure 11:
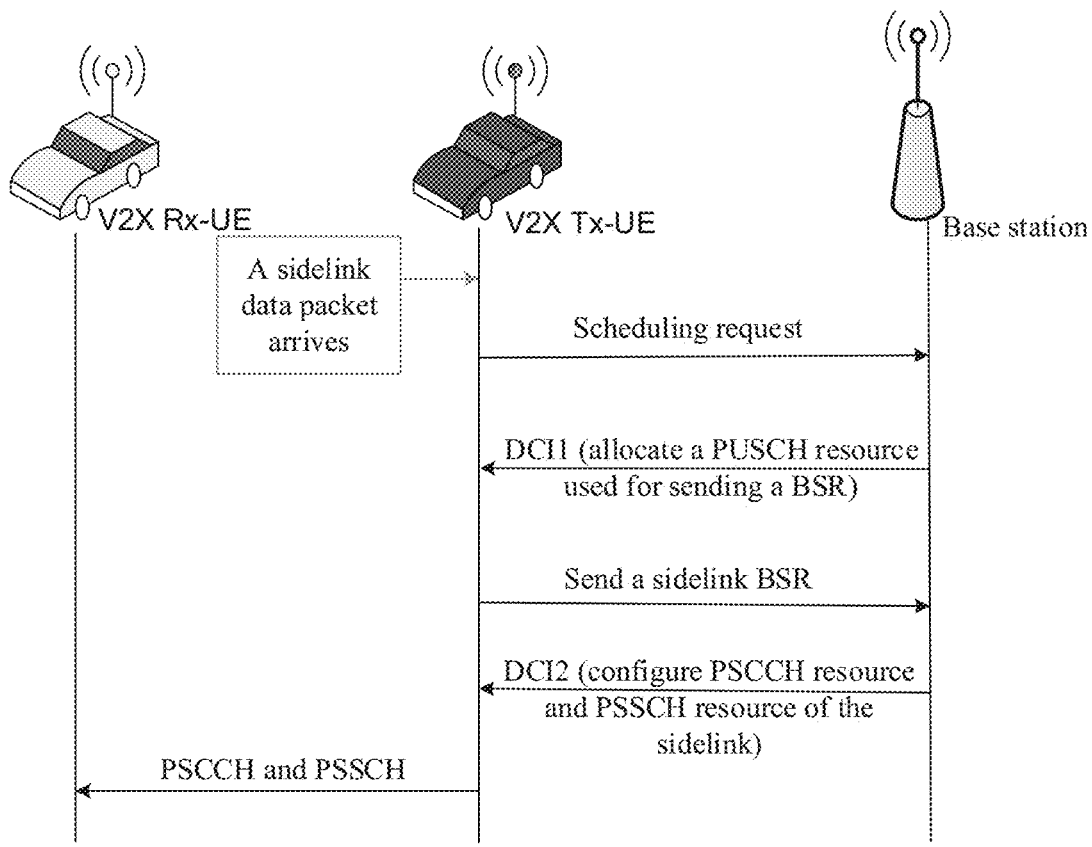
FIG. 11 is a schematic flowchart of a data transmission method provided by an example of the present disclosure.

As shown in FIG. 11, a dynamic resource allocation flow in an NR-V2C mode 1. The base station schedules the Sidelink resource and allocates the PSCCH resource and the PSSCH resource for sidelink.

First step, there are data arriving on sidelink, at the moment, transmitting UE sends a resource scheduling request to the base station;

second step, the base station sends DCI1 to the transmitting UE and allocates the PUSCH resource used for reporting BSR;

third step, the transmitting UE sends BSR on the PUSCH resource scheduled by the base station; and fourth step, the base station, after receiving the BSR reported by the UE, allocates the PSCCH resource and PSSCH resource used for sidelink transmission for the UE according to the amount of a transmission data volume and sends DCI2.

As shown in FIG. 5, when the higher-priority service arrives and discovers that there is no available transmission resource, the base station selects a preempted resource for the higher-priority service in a reserved resource allocation table. The selected preempted resource needs to meet a demand of the amount of the transmission data volume firstly and meet a demand of time delay of the services secondly.

The base station, after preempting the reserved resource of the lower-priority service user for the higher-priority service user, needs to realize resource allocation of the higher-priority service and resource recovery of the preempted lower-priority service by completing a set of signaling flows.

Figure 12:
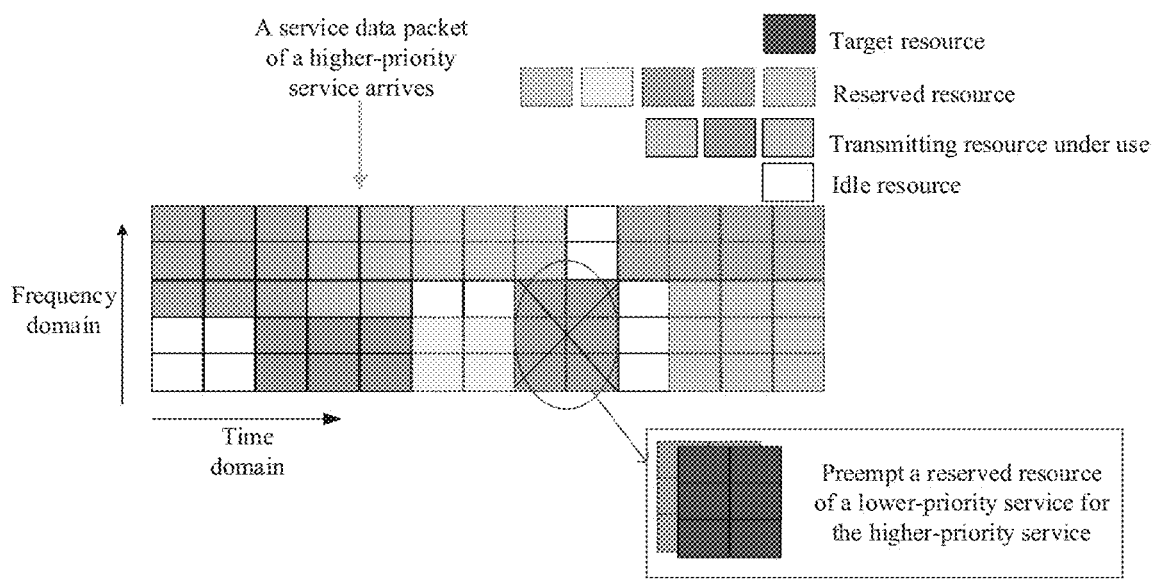
FIG. 12 is a schematic diagram of preemption of a transmission resource provided by an example of the present disclosure.

FIG. 12 is a schematic diagram of a preemption of a reserved resource of the lower-priority service by the higher-priority service. When the service data of the higher-priority service arrive, if the base station discovers that the rest of resources are insufficient to fully bear the service data of the higher-priority service, the reserved resource preconfigured for the lower-priority service is allocated for the higher-priority service.

Figure 13:
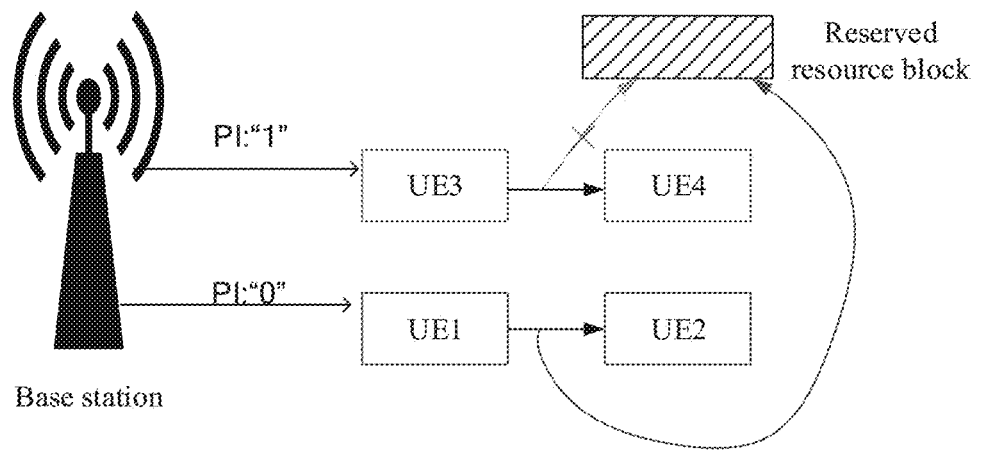
FIG. 13 is a schematic diagram of indicating preemption of a transmission resource through a PI field provided by an example of the present disclosure.
Figure 14:
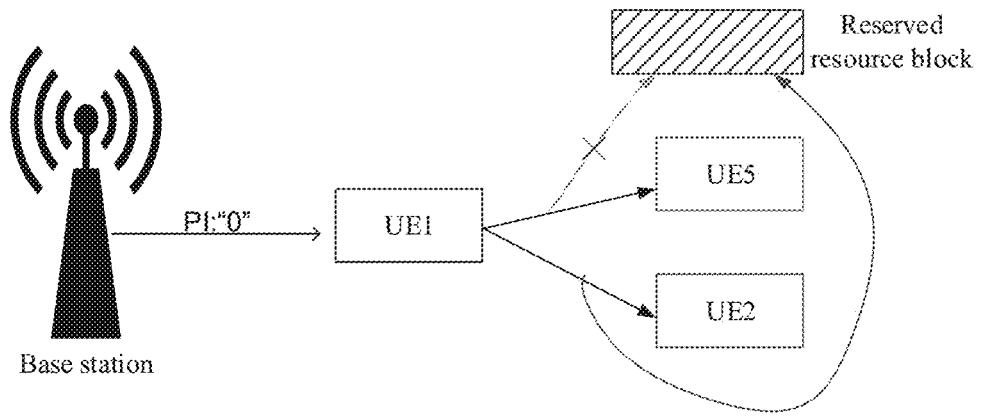
FIG. 14 is a schematic diagram of indicating preemption of a transmission resource through a PI field provided by an example of the present disclosure.

As shown in FIG. 13 to FIG. 14, a PI field is added in the DCI, occupies 1 bit and takes a value of "0" or "1". "0" represents resource allocation, and a resource indicated in the DCI may be used for sidelink transmission; and "1" represents resource recovery, and a resource indicated in the DCI is a reserved resource needing to be canceled. Transmitting end UE of the preempted service, after receiving the DCI sent by the base station, detects that the PI field is "1", at the moment, transmission of the lower-priority service on the reserved resource needs to be canceled, but the lower-priority service does not need to make a resource request again, because the base station will actively reallocate a resource for the lower-priority service afterwards.

As shown in FIG. 13, the base station indicates, through the PI field, that the higher-priority service between UE1 and UE2 preempts a reserved resource block of the lower-priority service between UE3 and UE4 for transmitting the service data of the higher-priority service, and UE3 abandons transmission of the service data of the lower-priority service to UE4 on the preempted transmission resource.

As shown in FIG. 14, the base station indicates UE1, through the PI field, that the service data of the higher-priority service of UE1 preempt its own reserved resource block transmitting the service data of the lower-priority service to the UE5 so as to transmit the service data of the higher-priority service to UE2.

Transmitting end UE of the preempting service, after receiving the DCI sent by the base station, detects that the PI field is "0", and at the moment, transmission on the sidelink will be performed by using the resource indicated in the DCI. Besides, in order to improve the resource utilization ratio, the periodical service and the non-periodical service are allowed to coexist in the same resource pool.

The DCI is scrambled by using the SLV-RNTI or SLV-SPS-RNTI, so that the periodical service and the non-periodical service can be distinguished. If the DCI is scrambled by using SLV-RNTI, it indicates that the service is the non-periodical service, otherwise, if the DCI is scrambled by using SLV-SPS-RNTI, it indicates that the service is the periodical service.

Figure 15:
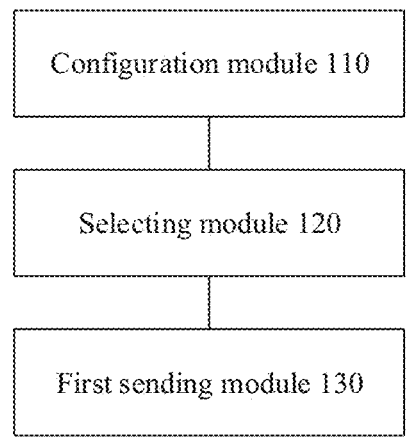
FIG. 15 is a schematic structural diagram of a data processing apparatus provided by an example of the present disclosure.

As shown in FIG. 15, an example provides a data processing apparatus, applied to a base station and including:

a configuration module 110, configured to configure a first transmission resource for a first priority service;

a selecting module 120, configured to select at least a part of the first transmission resource to be configured for a second priority service in response to determining that rest of transmission resources cannot fully bear service data of the second priority service, where a priority of the second priority service is higher than a priority of the first priority service; and a first sending module 130, configured to send first downlink control information (DCI), where the first DCI is used for indicating preemption of a transmission resource of the first priority service by the second priority service.

In some examples, the configuration module 110, the selecting module 120 and the first sending module 130 may be program modules, and the program modules, after being executed by a processor, can realize functions of the above modules.

In some other examples, the configuration module 110, the selecting module 120 and the first sending module 130 may be software and hardware combined modules, and the software and hardware combined modules include but are not limited to a programmable array. The programmable array includes but is not limited to a complex programmable array or a field programmable array.

In some other examples, the configuration module 110, the selecting module 120 and the first sending module 130 may be a complete hardware module, and the complete hardware module includes a special-purpose integrated circuit.

In some examples, the first DCI includes a preemption field. The preemption field is used for indicating user equipment (UE) of the first priority service that the transmission resource of the first priority service is preempted by the second priority service in response to determining that the preemption field has a first value; or the preemption field is used for indicating UE of the second priority service that the second priority service preempts the transmission resource of the first priority service in response to determining that the preemption field has a second value.

In some examples, the first sending module 130 is configured to send first DCI of which the preemption field has the first value to first user equipment (UE) and send first DCI of which the preemption field has the second value to second UE in response to determining that the first priority service of which the transmission resource is preempted belongs to the first UE and the second priority service which preempts the transmission resource belongs to the second UE;

or, send the first DCI of which the preemption field has the first value to third UE in response to determining that the first priority service of which the transmission resource is preempted and the second priority service which preempts the transmission resource belong to the same third UE;

or, send the first DCI of which the preemption field has the second value to the third UE in response to determining that the first priority service of which the transmission resource is preempted and the second priority service which preempts the transmission resource belong to the same third UE.

In some examples, the first sending module 130 is configured to send first DCI scrambled by using a first sequence in response to determining that the second priority service is a periodical service; or send first DCI scrambled by using a second sequence in response to determining that the second priority service is a non-periodical service.

In some examples, the first sequence is: sidelink vehicle (SLV)-semi-persistent scheduling (SPS)-radio network temporary identity (RNTI); and the second sequence is: SLV-RNTI.

In some examples, the apparatus further includes:

an allocation module, configured to reallocate a second transmission resource for the first priority service of which the transmission resource is preempted.

The first sending module 130 is further configured to send second DCI carrying resource information of the second transmission resource.

In some examples, the apparatus further includes:

a first receiving module, configured to receive a resource scheduling request of the second priority service.

The first sending module 130 is configured to send third DCI carrying resource information of a physical uplink shared channel (PUSCH) resource according to the resource scheduling request.

The first receiving module is configured to receive a buffer status report (BSR) of the second priority service on the PUSCH resource.

The apparatus further includes:

a determining module, configured to determine the quantity of resources needed to transmit the service data of the second priority data according to the BSR of the second priority service.

In some examples, the configuration module 110 is further configured to allocate a physical sidelink control channel (PSCCH) resource and a physical sidelink shared channel (PSSCH) resource sidelink configuration according to the resource scheduling request in mode 1 of new radio vehicle-to-everything R-V2X; and select at least a part of the PSCCH resource and/or the PSSCH resource configured for the first priority service to be configured for the second priority service according to the quantity of resources.

Figure 16:
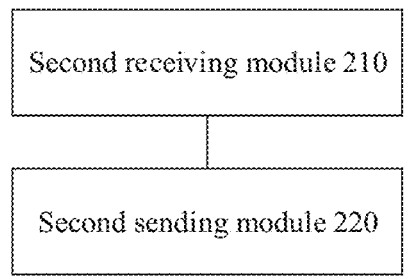
FIG. 16 is a schematic structural diagram of another data processing apparatus provided by an example of the present disclosure.

As shown in FIG. 16, an example provides a data processing apparatus, applied to user equipment (UE) and including:

a second receiving module 210, configured to receive first downlink control information (DCI); and a second sending module 220, configured to transmit service data according to the first DCI.

For example, the second sending module 220 is configured to preempt at least a part of a first transmission resource of a first priority service so as to transmit service data of a second priority service; and/or abandon transmission of the first priority service those transmission resource is preempted.

A priority of the second priority service is higher than a priority of the first priority service.

In some examples, the second sending module 220 and the second receiving module 210 may be program modules, and the program modules, after being executed by a processor, can realize the functions of the above modules.

In some other examples, the second sending module 220 and the second receiving module 210 may be software and hardware combined modules, and the software and hardware combined modules include but are not limited to a programmable array. The programmable array includes but is not limited to a complex programmable array or field programmable array.

In some other examples, the second sending module 220 and the second receiving module 210 may be complete hardware modules, and the complete hardware modules include a special-purpose integrated circuit.

In some examples, the first DCI includes a preemption field.

The second sending module 220 is configured to preempt at least a part of the first transmission resource of the first priority service so as to transmit the service data of the second priority service in response to determining that one of the first priority service of which the transmission resource is preempted and the second priority service which preempts the transmission resource belongs to the UE and the preemption field has a first value;

or, abandon transmission of the first priority service of which the transmission resource is preempted in response to determining that one of the first priority service of which the transmission resource is preempted and the second priority service which preempts the transmission resource belongs to the UE and the preemption field has a second value;

or, preempt at least a part of the first transmission resource of the first priority service so as to transmit the service data of the second priority service and abandon transmission of the first priority service of which the transmission resource is preempted in response to determining that both the first priority service of the transmission resource is preempted and the second priority service which preempts the transmission resource belong to the UE and the preemption field has the first value;

or, preempt at least a part of the first transmission resource of the first priority service so as to transmit the service data of the second priority service and abandon transmission of the first priority service of which the transmission resource is preempted in response to determining that both the first priority service of which preempts the transmission resource and the second priority service which preempts the transmission resource belong to the UE and the preemption field has the second value.

In some examples, the second receive module 210 is configured to receive second DCI carrying resource information of a second transmission resource.

The second sending module 220 is configured to transmit service data of the first priority service of which the transmission resource is preempted on the second transmission resource.

In some examples, the apparatus further includes:

a first determining module, configured to determine that the second priority service which preempts the transmission resource is a periodical service and periodically preempts at least a part of the first transmission resource of the first priority service in response to determining that the first DCI is successfully descrambled by using a first sequence; or a second determining module, configured to determine that the second priority service which preempts the transmission resource is a non-periodical service in response to determining that the first DCI is successfully descrambled by using a second sequence.

In some examples, the first sequence is: sidelink vehicle (SLV)-semi-persistent scheduling (SPS)-radio network temporary identity (RNTI); and the second sequence is: SLV-RNTI.

In some examples, the second sending module 220 is configured to report a resource scheduling request of the second priority service.

The second receiving module 210 is configured to receive third DCI carrying resource information of a physical uplink shared channel (PUSCH) resource sent according to the resource scheduling request.

The second sending module 220 is configured to report a buffer status report (BSR) of the second priority service on the PUSCH resource, where the BSR is used for enabling the base station to determine the quantity of resources needed to transmit the service data of the second priority service.

An example of the present disclosure provides a communication device, including:

a transceiver, a memory, and a processor, connected with the transceiver and the memory respectively, configured to control the transceiver to send and receive a wireless signal and implement the information processing method provided by any example above, for example, one or a plurality of methods among the methods shown in FIG. 6 to FIG. 11 by executing computer executable instructions stored on the memory.

The communication device may include a base station or UE.

The transceiver may include: one or more antennas.

Figure 17:
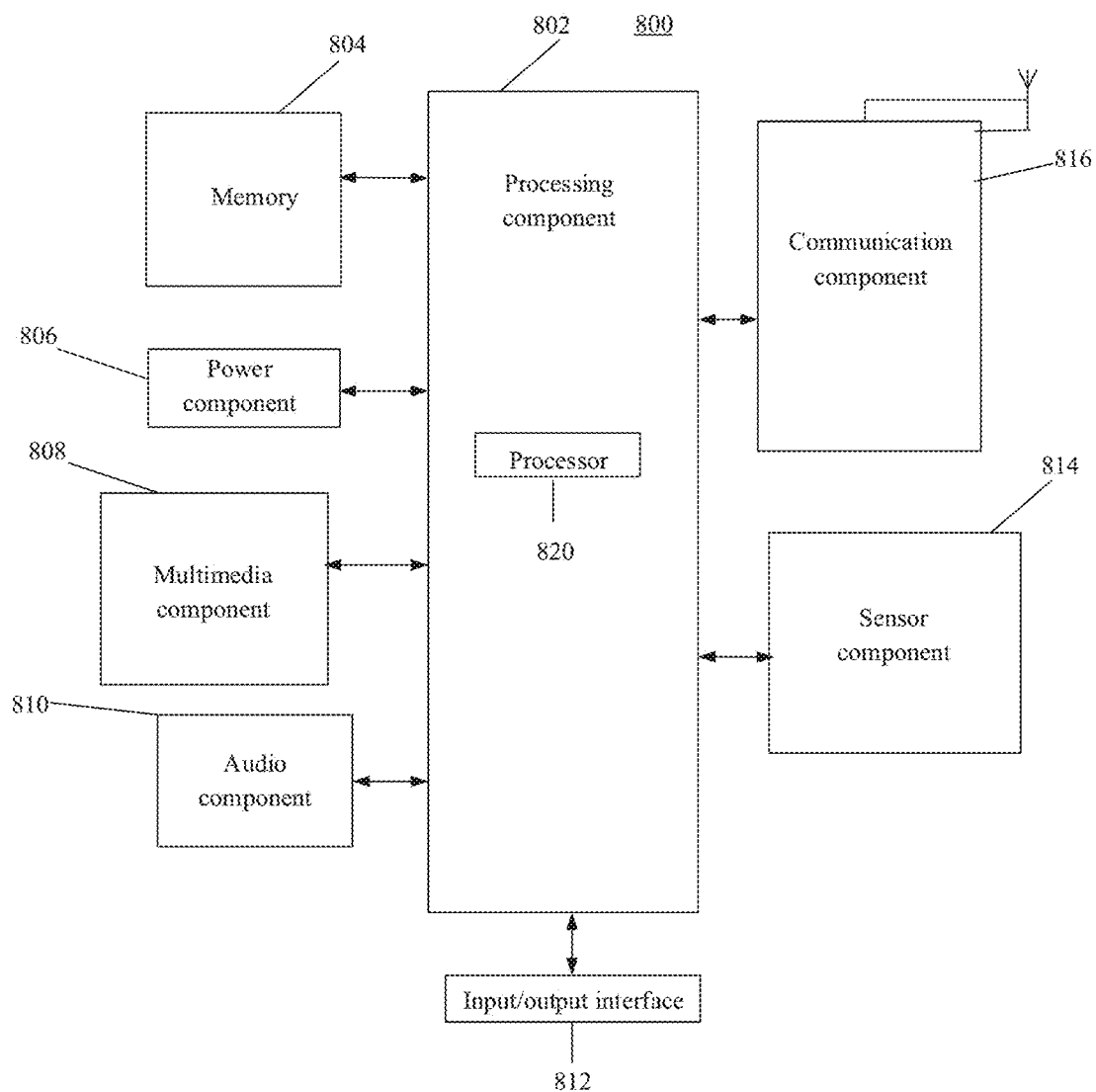
FIG. 17 is a schematic structural diagram of a terminal provided by an example of the present disclosure.

FIG. 17 is terminal shown according to an example. The terminal may be specifically, a mobile phone, a computer, a digital broadcast terminal, a messaging device, a game console, a tablet device, a medical device, a fitness facility, a personal digital assistant, etc.

Referring to FIG. 17, the terminal 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the terminal 800, such as operations related to display, phone call, data communication, camera operation and recording operation. The processing component 802 may include one or more processors 820 for executing the instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various data so as to support operations on the terminal 800. Examples of these data include instructions of any application program or method for operation on the terminal 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for the various components of the terminal 800. The power component 806 may include a power management system, one or more power sources, and other components related to power generation, management and distribution for the terminal 800.

The multimedia component 808 includes a screen which provides an output interface between the terminal 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a back camera. When the equipment 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the terminal 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the terminal 800. For example, the sensor component 814 may monitor a start/shut-down state of the terminal 800 and relative positioning of the components, for example, the components are a display and a keypad of the terminal 800. The sensor component 814 may further detect position change of the terminal 800 or one component of the terminal 800, whether there is contact between the user and the terminal 800, and azimuth or speed up/speed down and temperature change of the terminal 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and the other devices. The terminal 800 may be accessed to a wireless network based on a communication standard, such as Wi-Fi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the terminal 800 may be implemented by one or more than one application specific integrated circuit (ASIC), digital signal processor (DSP), digital signal processing device (DSPD), programmable logic device (PLD), field-programmable gate array (FPGA), controller, micro-controller, microprocessor or other electronic element for executing the above method.

In an example, a non-transitory computer readable storage medium including instructions is further provided, such as a memory 804 including the instructions. The instructions may be executed by a processor 820 of the terminal 800 so as to complete the above method. For example, the non-transitory computer readable storage medium may be an ROM, a random access memory (RAM), a CD-ROM, a magnetic tape, a floppy disk, an optical data storage device and the like.

Figure 18:
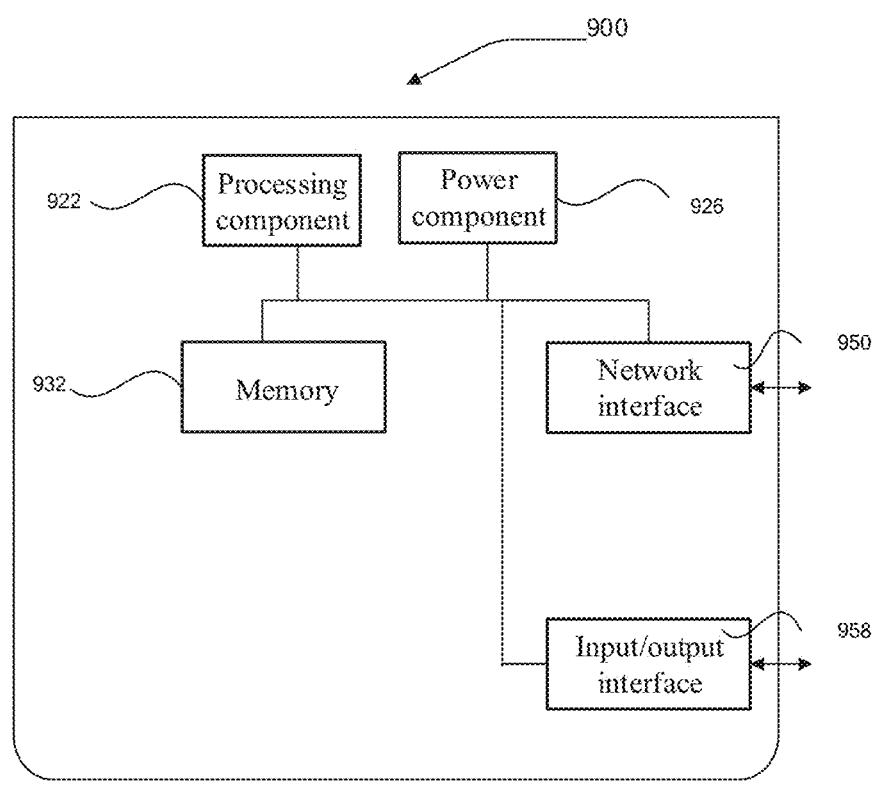
FIG. 18 is a schematic structural diagram of a base station provided by an example of the present disclosure.

FIG. 18 is a schematic diagram of a base station. Referring to FIG. 18, the base station 900 includes a processing component 922 which further includes one or more processors, and a memory resource represented by a memory 932 which is configured to store an instruction capable of being executed by the processing component 922, for example, an application. The application stored in the memory 932 may include one or more modules each of which corresponds to a set of instructions. Besides, the processing component 922 is configured to execute the instruction so as to execute any frame transmission method shown in FIG. 3 to FIG. 5.

The base station 900 may further include a power component 926 configured to execute power management of the base station 900, a wired or wireless network interface 950 is configured to connect the base station 900 to a network, and an input/output (I/O) interface 958. The base station 900 may operate an operation system stored in the memory 932, for example, Windows Server™, Mac OS X™, Unix™, Linux™, FreeBSD™, or the like.

An example of the present disclosure provides a communication device which may be a terminal or a base station. The communication device includes: a transceiver, a memory, and a processor connected with an antenna and the memory respectively and configured to control the transceiver to send and receive a wireless signal and can implement the data processing method of any example above by executing computer executable instructions stored in the memory, for example, one or a plurality of methods in the methods shown in FIG. 6 to FIG. 11.

An example of the present disclosure further provides a non-transitory computer readable storage medium storing computer executable instructions. The computer executable instructions, after being executed by a processor, can implement the data processing method provided by any technical solution above, for example, at least one of the methods shown in FIG. 2, FIG. 4 to FIG. 5.

Those skilled in the art will easily figure out other implementation solutions of the present disclosure after considering the specification and practicing the disclosure disclosed herein. The present disclosure intends to cover any transformation, purpose or adaptive change of the present disclosure which conforms to a general principle of the present disclosure and includes common general knowledge or conventional technical means which are not disclosed by the present disclosure in the technical field. The specification and the examples are only regarded as illustrative.

It should be understood that the present disclosure is not limited to an accurate structure described above and shown in the drawings, and various modifications and changes can be made without departing from its scope.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A data processing method, performed by a base station and comprising:
   configuring a first transmission resource for a first priority service;
   selecting at least a part of the first transmission resource to be configured for a second priority service in response to determining that rest of transmission resources cannot fully bear service data of the second priority service, wherein a priority of the second priority service is higher than a priority of the first priority service; and
   sending first downlink control information (DCI), wherein the first DCI is used for indicating preemption of a transmission resource of the first priority service by the second priority service;
   wherein the preemption of the transmission resource of the first priority service by second priority service is resource preemption in a symbol level;
   wherein the first DCI comprises a preemption field;
   wherein the preemption field is used for indicating user equipment (UE) of the first priority service that the transmission resource of the first priority service is preempted by the second priority service in response to determining that the preemption field has a first value;
   wherein the preemption field is used for indicating UE of the second priority service that the second priority service preempts the transmission resource of the first priority service in response to determining that the preemption field has a second value; and
   wherein sending the first downlink control information (DCI) comprises:
   sending first DCI scrambled by using a first sequence in response to determining that the second priority service is a periodical service; or
   sending first DCI scrambled by using a second sequence in response to determining that the second priority service is a non-periodical service.

2. The data processing method according to claim 1, wherein sending the first downlink control information (DCI) comprises one of the following:
   sending first DCI of which the preemption field has the first value to first user equipment (UE) and sending first DCI of which the preemption field has the second value to second UE in response to determining that the first priority service of which the transmission resource is preempted belongs to the first UE and the second priority service which preempts the transmission resource belongs to the second UE;
   sending the first DCI of which the preemption field has the first value to third UE in response to determining that the first priority service of which the transmission resource is preempted and the second priority service which preempts the transmission resource belong to the same third UE; or
   sending the first DCI of which the preemption field has the second value to the third UE in response to determining that the first priority service of which the transmission resource is preempted and the second priority service which preempts the transmission resource belong to the same third UE.

3. The data processing method according to claim 1, further comprising:
   reallocating a second transmission resource for the first priority service of which the transmission resource is preempted; and
   sending second DCI carrying resource information of the second transmission resource.

4. A data processing method, performed by user equipment (UE) and comprising:
   receiving first downlink control information (DCI), wherein the first DCI comprises a preemption field; and
   transmitting service data according to the first DCI, wherein transmitting the service data according to the first DCI comprises: preempting at least a part of a first transmission resource of a first priority service so as to transmit service data of a second priority service, wherein a priority of the second priority service is higher than a priority of the first priority service;
   wherein the preemption of the transmission resource of the first priority service is resource preemption in a symbol level;
   wherein the preemption field is used for indicating user equipment (UE) of the first priority service that the transmission resource of the first priority service is preempted by the second priority service in response to determining that the preemption field has a first value; and
   wherein the preemption field is used for indicating UE of the second priority service that the second priority service preempts the transmission resource of the first priority service in response to determining that the preemption field has a second value;
   the method further comprising:
   determining that the second priority service which preempts the transmission resource is a periodical service and periodically preempts at least a part of the first transmission resource of the first priority service in response to determining that the first DCI is successfully descrambled by using a first sequence; or
   determining that the second priority service which preempts the transmission resource is a non-periodical service in response to determining that the first DCI is successfully descrambled by using a second sequence.

5. The data processing method according to claim 4, wherein transmitting the service data according to the first DCI comprises:
abandoning transmission of the first priority service of which the transmission resource is preempted according to the first DCI.

6. The data processing method according to claim 4, wherein
transmitting the service data according to the first DCI comprises one of the following:
preempting at least a part of the first transmission resource of the first priority service so as to transmit the service data of the second priority service in response to determining that one of the first priority service of which the transmission resource is preempted and the second priority service which preempts the transmission resource belongs to the UE and the preemption field has a first value;
abandoning transmission of the first priority service of which the transmission resource is preempted in response to determining that one of the first priority service of which the transmission resource is preempted and the second priority service which preempts the transmission resource belongs to the UE and the preemption field has a second value;
preempting at least a part of the first transmission resource of the first priority service so as to transmit the service data of the second priority service and abandoning transmission of the first priority service of which the transmission resource is preempted in response to determining that both the first priority service of which the transmission resource is preempted and the second priority service which preempts the transmission resource belong to the UE and the preemption field has the first value; or
preempting at least a part of the first transmission resource of the first priority service so as to transmit the service data of the second priority service and abandoning transmission of the first priority service of which the transmission resource is preempted in response to determining that both the first priority service of which the transmission resource is preempted and the second priority service which preempts the transmission resource belong to the UE and the preemption field has the second value.

7. The data processing method according to claim 4, further comprising:
receiving second DCI carrying resource information of a second transmission resource; and
transmitting service data of the first priority service of which the transmission resource is preempted on the second transmission resource.

8. User equipment (UE), comprising:
a transceiver;
a memory; and
a processor connected with the transceiver and the memory respectively, and configured to control the transceiver to send and receive a wireless signal and implement operations by executing computer executable instructions stored on the memory as follows:
receiving first downlink control information (DCI), wherein the first DCI comprises a preemption field; and
transmitting service data according to the first DCI, wherein transmitting the service data according to the first DCI comprises: preempting at least a part of a first transmission resource of a first priority service so as to transmit service data of a second priority service, wherein a priority of the second priority service is higher than a priority of the first priority service;
wherein the preemption of the transmission resource of the first priority service is resource preemption in a symbol level;
wherein the preemption field is used for indicating user equipment (UE) of the first priority service that the transmission resource of the first priority service is preempted by the second priority service in response to determining that the preemption field has a first value; and
the preemption field is used for indicating UE of the second priority service that the second priority service preempts the transmission resource of the first priority service in response to determining that the preemption field has a second value;
wherein the processor is further configured to:
determine that the second priority service which preempts the transmission resource is a periodical service and periodically preempts at least a part of the first transmission resource of the first priority service in response to determining that the first DCI is successfully descrambled by using a first sequence; or
determine that the second priority service which preempts the transmission resource is a non-periodical service in response to determining that the first DCI is successfully descrambled by using a second sequence.

9. The UE according to claim 8, wherein the processor is further configured to:
abandon transmission of the first priority service of which the transmission resource is preempted according to the first DCI.

10. The UE according to claim 8, wherein
the processor is further configured to perform one of the following:
preempt at least a part of the first transmission resource of the first priority service so as to transmit the service data of the second priority service in response to determining that one of the first priority service of which the transmission resource is preempted and the second priority service which preempts the transmission resource belongs to the UE and the preemption field has a first value;
abandon transmission of the first priority service of which the transmission resource is preempted in response to determining that one of the first priority service of which the transmission resource is preempted and the second priority service which preempts the transmission resource belongs to the UE and the preemption field has a second value;
preempt at least a part of the first transmission resource of the first priority service so as to transmit the service data of the second priority service and abandon transmission of the first priority service of which the transmission resource is preempted in response to determining that both the first priority service of which the transmission resource is preempted and the second priority service which preempts the transmission resource belong to the UE and the preemption field has the first value; or
preempt at least a part of the first transmission resource of the first priority service so as to transmit the service data of the second priority service and abandon transmission of the first priority service of which the transmission resource is preempted in response to determining that both the first priority service of which the transmission resource is preempted and the second priority service which preempts the transmission resource belong to the UE and the preemption field has the second value.

11. The UE according to claim 8, wherein the processor is further configured to:
receive second DCI carrying resource information of a second transmission resource; and
transmit service data of the first priority service of which the transmission resource is preempted on the second transmission resource.

* * * * *